(12) United States Patent  
Morishita

(10) Patent No.: US 10,434,414 B2  
(45) Date of Patent: Oct. 8, 2019

(54) TERMINAL DEVICE, PROGRAM, AND METHOD

(71) Applicant: GungHo Online Entertainment, Inc., Tokyo (JP)

(72) Inventor: Kazuki Morishita, Tokyo (JP)

(73) Assignee: GungHo Online Entertainment, Inc. (JP)

( * ) Notice: Subject to any disclaimer, the term of this patent is extended or adjusted under 35 U.S.C. 154(b) by 215 days.

(21) Appl. No.: 15/617,623

(22) Filed: Jun. 8, 2017

(65) Prior Publication Data

US 2018/0221770 A1    Aug. 9, 2018

Related U.S. Application Data

(63) Continuation of application No. PCT/JP2017/004627, filed on Feb. 8, 2017.

(51) Int. Cl.
| | | |
|---|---|---|
| A63F 13/58 | (2014.01) | |
| A63F 13/35 | (2014.01) | |
| A63F 13/92 | (2014.01) | |
| A63F 13/77 | (2014.01) | |

(52) U.S. Cl.
CPC ............ *A63F 13/58* (2014.09); *A63F 13/35* (2014.09); *A63F 13/77* (2014.09); *A63F 13/92* (2014.09)

(58) Field of Classification Search
USPC .......................................................... 463/23
See application file for complete search history.

(56) References Cited

U.S. PATENT DOCUMENTS

| | | | |
|---|---|---|---|
| 6,338,679 B1 | 1/2002 | Okada et al. | |
| 2003/0191560 A1 | 10/2003 | Yokoo et al. | |
| 2005/0220044 A1* | 10/2005 | Choi ................. | A63F 13/10 |
| | | | 370/310 |
| 2016/0114251 A1* | 4/2016 | Galic .................. | A63F 13/69 |
| | | | 463/25 |

FOREIGN PATENT DOCUMENTS

| | | |
|---|---|---|
| JP | H09-140933 A | 6/1997 |
| JP | 2000-245956 A | 9/2000 |
| JP | 2001-096068 A | 4/2001 |
| JP | 2001-145776 A | 5/2001 |
| JP | 2007-082761 A | 4/2007 |
| JP | 2013-144062 A | 7/2013 |
| JP | 2016-168160 A | 9/2016 |
| JP | 2016-185344 A | 10/2016 |
| WO | WO-2000-066239 A1 | 11/2000 |

OTHER PUBLICATIONS

Androider, Impress Japan Corporation, Jun. 2013, pp. 2-3, 9 and 30 (12 pages).
Japanese Office Action for JP Application No. 2017-507887, dated Jul. 24, 2018 (7 pages).

* cited by examiner

*Primary Examiner* — Pierre E Elisca
(74) *Attorney, Agent, or Firm* — Harness, Dickey & Pierce, P.L.C.

(57) ABSTRACT

The terminal device includes a battery for storing power, a battery control circuit that detects a state of the battery, and a processor configured to vary a parameter to be used in execution of the predetermined game application on the basis of the state of the battery detected in the battery control circuit in executing the predetermined game application while consuming the power supplied from the battery according to an instruction of a user.

19 Claims, 14 Drawing Sheets

| USER ID | CHARACTER ID | LEVEL | MAXIMUM STAMINA | REMAINING STAMINA |
|---|---|---|---|---|
| I | A | 10 | 60 | 12 |
| II | B | 25 | 80 | 10 |
| III | C | 30 | 90 | 80 |
| IV | D | 15 | 120 | 5 |
| V | E | 3 | 90 | 90 |
| ⋮ | ⋮ | ⋮ | ⋮ | ⋮ |

Fig. 5a

| UNIT GAME ID | CONSUMED STAMINA |
|---|---|
| a | 5 |
| b | 10 |
| c | 13 |
| d | 5 |
| e | 20 |
| ⋮ | ⋮ |

Fig. 5b

| CHARACTER ID | ATTACK POWER | DEFENSE POWER | RECOVERY POWER | MAGIC | HIT POINT | SPECIAL ABILITY |
|---|---|---|---|---|---|---|
| A | 190 | 40 | 100 | 15 | 2000 | THREE-FOLD ATTACK POWER |
| B | 300 | 50 | 10 | 5 | 1500 | TWO-FOLD DEFENSE POWER |
| C | 250 | 30 | 50 | 100 | 1500 | FOUR-FOLD ATTACK POWER |
| D | 100 | 150 | 400 | 300 | 500 | TEN-FOLD ATTACK POWER |
| E | 50 | 400 | 250 | 200 | 3000 | FIVE-FOLD DEFENSE POWER |
| ⋮ | ⋮ | ⋮ | ⋮ | ⋮ | ⋮ | ⋮ |

Fig. 5c

TERMINAL DEVICE, PROGRAM, AND METHOD

CROSS-REFERENCE TO RELATED APPLICATIONS

The present application is a continuation application of International Application No. PCT/JP2017/004627, filed Feb. 8, 2017. The contents of this application are incorporated herein by reference in their entirety.

TECHNICAL FIELD

The present disclosure relates to a terminal device that can execute a predetermined game application.

BACKGROUND

Conventionally, terminal devices that can execute a game application in which content of a game such as parameters associated with a user character and an enemy character are changed according to a battle between the user character and the enemy character are known. For example, Japanese Publication No. JP 2016-185344 describes a terminal device that can calculate a life parameter (hit point) of an enemy character on the basis of an attack power parameter of a player character and a defense power parameter of the enemy character in a battle game application.

SUMMARY

In view of the technologies as described above, the present disclosure provides a terminal device that can execute a game application having higher enjoyment by varying content of a game performed by execution of the game application according to a state of the terminal device itself, which has not been used in the conventional game application, such as a state of a battery of the terminal device that executes the game application, according to various embodiments.

According to one aspect of the present disclosure, "a terminal device comprising a battery for storing power, a battery control circuit that detects a state of the battery, and a processor that varies a parameter to be used in execution of a predetermined game application on the basis of the state of the battery detected in the battery control circuit in executing the predetermined game application while consuming the power supplied from the battery according to an instruction of a user" is provided.

According to one aspect of the present disclosure, "a non-transitory computer program enabling a computer comprising a battery for storing power and a battery control circuit that detects a state of the battery to function as: a processor configured to vary a parameter to be used in execution of a predetermined game application on the basis of the state of the battery detected in the battery control circuit in executing the predetermined game application while consuming the power supplied from the battery according to an instruction of a user" is provided.

According to one aspect of the present disclosure, "a method executed in a terminal device comprising a battery for storing power and a battery control circuit that detects a state of the battery, the method comprising: varying, by a processor of the terminal device, a parameter to be used in execution of a predetermined game application on the basis of the state of the battery detected in the battery control circuit in executing the predetermined game application while consuming the power supplied from the battery according to an instruction of a user" is provided.

According to various embodiments of the present disclosure, a terminal device that can execute a game application having higher enjoyment by varying content of a game performed by execution of the game application according to a state of the terminal device itself, which has not been used in the conventional game application, such as a state of a battery of the terminal device that executes the game application, can be provided.

Note that the above effect is merely an example for convenience of description, and is not restrictive. Any effect described in the present disclosure or apparent to a person skilled in the art can be exhibited in addition to or in place of the above-described effect.

BRIEF DESCRIPTION OF DRAWINGS

FIG. 5a is a diagram illustrating an example of a user information table stored in a memory 213 according to the first embodiment of the present disclosure.

FIG. 5b is a diagram illustrating an example of a unit game information table stored in the memory 213 according to the first embodiment of the present disclosure.

FIG. 5c is a diagram illustrating an example of a character information table stored in the memory 213 according to the first embodiment of the present disclosure.

DETAILED DESCRIPTION OF THE INVENTION

Figure 1:
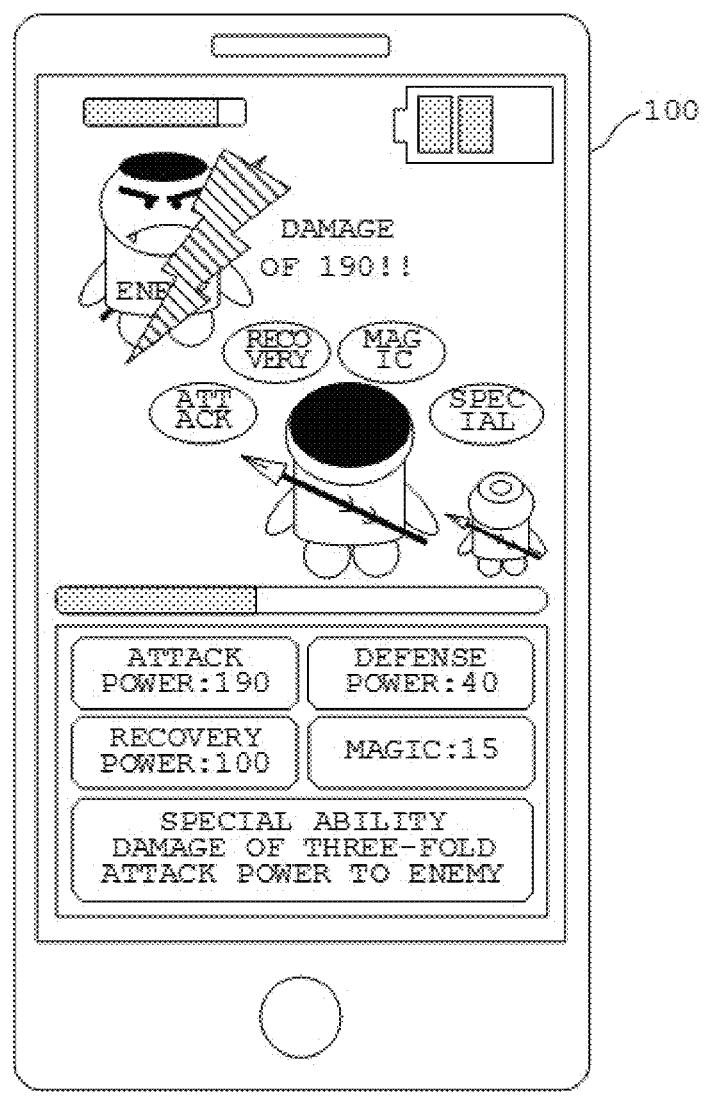
FIG. 1 is a diagram illustrating an example of a screen displayed in a terminal device 100 according to various embodiments of the present disclosure.

Various embodiments of the present disclosure will be described with reference to the appended drawings. Note that a configuration element common in the drawings is denoted with the same reference sign.

Outline of Game Application According to Present Disclosure

An example of a game application executed in a terminal device according to various embodiments of the present disclosure includes a game application in which a user selects one unit game or one of a plurality of unit games included in the game application, and the selected unit game is executed. To be specific, when the game application is executed in the terminal device, a screen for prompting the user to select a desired unit game from among one or a plurality of unit games, using stamina associated with the user, is displayed, and the selected unit game is executed. When the unit game is executed, a battle between a user character of the user itself and an enemy character is started, and a battle process is performed using various parameters associated with the user character. At a stage where a hit point (one of the above-described parameters) associated with either the user character or the enemy character becomes zero, the battle process is terminated, and the character whose hit point remains is processed to win. At this time, in a case where the user character wins, the enemy character is provided to (captured by) the user as a character operable by the user, at a predetermined drawing probability.

In the game application according to various embodiments of the present disclosure, at least one of content (for example, various parameters such as the stamina, an ability parameter, and the drawing probability, and a selectable unit game) of the game performed by execution of the application is varied on the basis of a state of a battery of the terminal device that executes the game application. At this time, as an example, the content of the game is varied to go against the user who inputs an instruction to the game application.

FIG. 1 is a diagram illustrating an example of a screen displayed in a terminal device 100 according to various embodiments of the present disclosure. To be specific, FIG. 1 is an example of a screen displayed when the battle process of the above-described outline is performed. A residual capacity of the battery, which indicates the state of the battery, is displayed on a display in the terminal device 100, in addition to the user character and the enemy character. FIG. 1 illustrates a state in which an ally character has attacked the enemy character with predetermined attack power. However, since the residual capacity of the battery sufficiently remains, a varying process of the content (the ability parameter in the example of FIG. 1) of the game is not performed.

Note that, in the present disclosure, the "unit game" means a unit of the game, and is expressed by, for example, a quest, a script, a chapter, a dungeon, a mission, or the like. The game application according to the present disclosure is configured from a plurality of the unit games. Then, in a storage unit of the terminal device and/or a server device, a program for executing the unit game and various types of information (beating information of the unit game, character information, consumed stamina, and the like) are stored in association with one another. Then, the unit game is executed by reading and executing the program and various types of information.

Further, in the present disclosure, the "stamina" is one of the parameters used in the game application, and is recovered as time proceeds while consumed (subtracted) by a predetermined amount every time execution of the unit game is selected. Further, the consumed parameter can be recovered by use of a predetermined virtual item purchased in the game application. Further, a maximum value of the stamina can be increased according to a result of the unit game by the user character, or the like.

Further, in the present disclosure, the "ability parameter" is one of the parameters used in the game application and is used in the battle process with the enemy character, in which the unit game is executed, and which specifies an ability of each user character. Examples of the ability parameter include attack power, defense power, recovery power, a magic, a hit point, and a special ability. The attack power is a parameter used to calculate damage to be provided to the enemy character at the time of an attack by the user character. The defense power is a parameter used to calculate damage to be provided to the user character at the time of an attack by the enemy character. The hit point is a parameter subtracted by a predetermined amount according to the provided damage. The hit point of the user character becoming zero means that the unit game is processed as "defeat" or use of the user character is restricted. The recovery power is a parameter used to calculate a recovery amount in recovering the subtracted hit point. The magic is a parameter indicating strength of an attack, a recovery, or a defense by magical power corresponding to the user character. The special ability is a parameter regarding an ability usable only in a case of a predetermined state (for example, use of a predetermined virtual item, an input of a predetermined command, or the like) during execution of the game application or the unit game by the user character.

Further, in the present disclosure, the "drawing probability" is one of the parameters used in the game application, and is a parameter regarding a winning probability in providing the enemy character to the user on the basis of a result of drawing using a pseudorandom number in the unit game.

Further, in the present disclosure, a state "going against the user" refers to a state going against the user himself/herself or the user character in execution of the game application. As described in the embodiments below, examples include a state of performing a process of decreasing the stamina or the ability parameter, and a state of performing a process of decreasing the drawing probability. Examples further include a state of performing a process of increasing the ability parameter of the enemy character to battle with, and a state of performing a process of decreasing the recovery power of the stamina, as long as the state goes against the user in the end, in addition to the above examples. A process of decreasing the number of the selectable unit games can also be an example of the state going against the user.

Further, in the present disclosure, the "state of the battery" is a state of the battery at a certain point of time, and is not limited to the residual capacity of the battery exemplified in the above description. Any state may be employed as long as the state is detectable or calculable by a battery control circuit or a processor, such as a state as to whether the battery is being charged, a temperature of the battery, or a decreasing rate of the battery. Further, the state of the battery is not limited to the examples, and the examples can be used in combination.

First Embodiment

Figure 2:
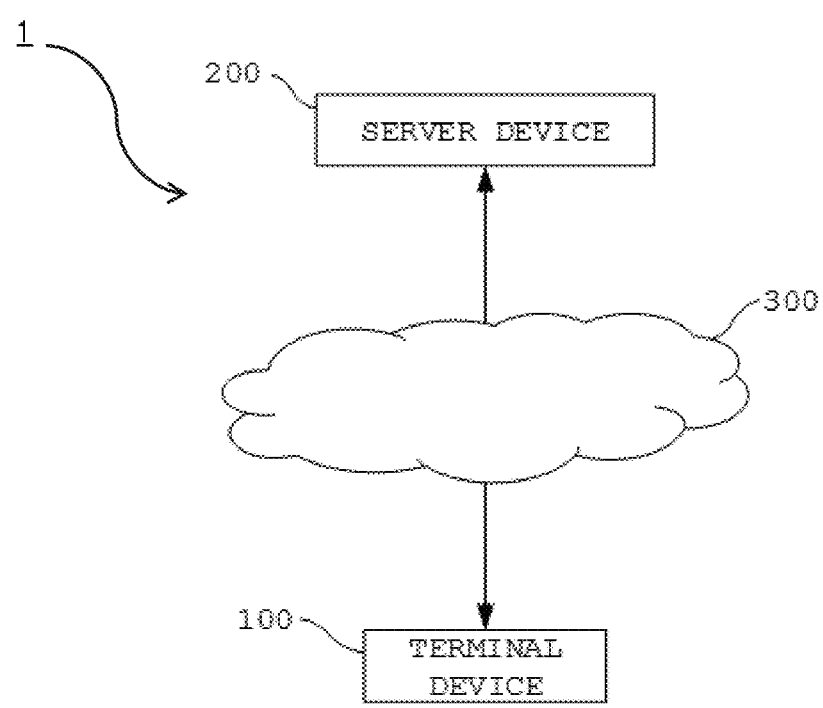
FIG. 2 is a conceptual diagram schematically illustrating a configuration of a system 1 according to a first embodiment of the present disclosure.

1. A Configuration of a System 1 According to a First Embodiment of the Present Disclosure FIG. 2 is a conceptual diagram schematically illustrating a configuration of a system 1 according to a first embodiment of the present disclosure. Referring to FIG. 2, the system 1 is configured from a terminal device 100 and a server device 200 communicatively connected with the terminal device 100 through a network 300. Note that, in some cases, a plurality of the terminal devices can be added to the system 1 and can execute an application in cooperation with one another.

In the system 1, a process regarding a game application is performed by execution of a game program stored in the terminal device 100. At this time, the terminal device 100 accesses the server device 200 and downloads user information, game progress information, the various parameters, and the like necessary for the progress of the game application, according to the progress of the game application.

2. Configuration of Terminal Device 100

Figure 3:
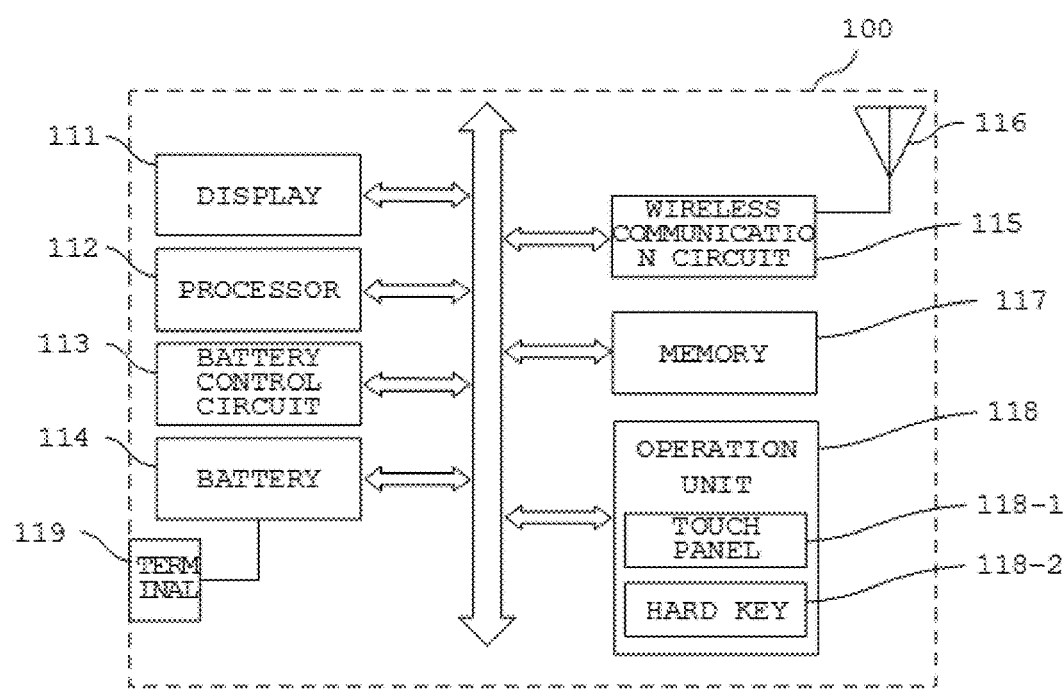
FIG. 3 is a block diagram illustrating an example of a configuration of the terminal device 100 according to the first embodiment of the present disclosure.

FIG. 3 is a block diagram illustrating an example of a configuration of the terminal device 100 according to the first embodiment of the present disclosure. Referring to FIG. 3, the terminal device 100 includes a display 111, a processor 112, a battery control circuit 113, a battery 114, a wireless communication circuit 115, an antenna 116, a memory 117, and an operation unit 118 including a touch panel 118-1 and a hard key 118-2. In the terminal device 100, these configuration elements are electrically connected with one another through a control line and a data line.

Examples of such a terminal device 100 include portable terminal devices capable of wireless communication represented by a smart phone, a portable game device, a feature phone, a portable information terminal, a PDA, and a laptop personal computer. Further, a desktop personal computer and a stand-alone game device can also be exemplified as long as those are driven upon receipt of power supply from the battery. Further, the elements of the terminal device 100 illustrated in FIG. 3 are examples, and some of the elements can be omitted or can be replaced with other elements according to a type of the applied terminal device. For example, the display 111 is provided inside the terminal device 100. However, the terminal device 100 may be a terminal device having the display 111 arranged outside the terminal device 100, and connected with the display 111 in a manner of communicating information with the display 111.

The display 111 reads image data stored in the memory 117 and performs various types of display regarding the game application in the present embodiment in response to an instruction input of the processor 112. The display 111 is configured from, for example, a liquid crystal display. In the present embodiment, the display 111 functions as a display unit in combination with other configuration elements.

The processor 112 is configured from at least one of a CPU (microcomputer), a DSP, and an ASIC, as an example, and controls the connected other configuration elements on the basis of various programs stored in the memory 117. To be specific, the processor 112 reads a program according to performing of the game application stored in the memory 117, as needed, and controls execution of the application. Further, the processor 112 controls execution of a process of varying various parameters to be used in execution of the game application according to a state of the battery 114 detected in the battery control circuit 113. Further, the processor 112 controls processes of reading and updating stored information such as tables stored in the memory 117. Then, the processor 112 functions as a control unit in combination with other configuration elements. Note that the processor 112 can be configured from a single processor or a combination of a plurality of processors. Further, the processor 112 can be configured from a combination of processors optimized to specific processes, such as image processing, and the processes can be distributed.

The battery control circuit 113 detects the state of the battery 114 in response to a request from the processor 112 and/or in every fixed period, and manages the state. For example, the battery control circuit 113 detects a battery voltage at the time of driving of the terminal device 100 to detect its residual capacity. Note that the above method of detecting the residual capacity is an example, and the residual capacity can be detected by a known method. Further, the battery control circuit 113 monitors whether an AC adaptor connected to an external power source is connected to a battery terminal 119 by a known method. The battery control circuit 113 stores, to the memory 117, the detected residual capacity of the battery and a result of whether the battery is being charged. The battery control circuit 113 functions as a battery control unit in combination with other configuration elements in the present embodiment.

The battery 114 stores power for driving the configuration elements such as the processor 112 included in the terminal device. Favorably, a secondary battery such as a lithium ion battery rechargeable using a predetermined charging device is used. Further, the battery 114 is connected with the battery terminal 119, and receives power supply as charging power from the external power source through the AC adaptor connected to the external power source. In the present embodiment, the battery 114 functions as a battery unit in combination with other configuration element.

The wireless communication circuit 115 functions as a wireless communication unit in combination with other configuration elements including the antenna 116. The wireless communication circuit 115 transmits/receives information to/from the remotely installed server device 200 and other terminal devices. To be specific, the wireless communication circuit 115 performs processes of modulating and demodulating image data for drawing a game space, in addition to the program for executing the game application necessary for execution of the game application according to the present embodiment, user information, unit game information, and character information, and transmits/receives the information through the antenna 116. The wireless communication circuit 115 performs the process on the basis of a wideband wireless communication system represented by a wideband-code division multiple access (W-CDMA) system or an LTE system. However, the wireless communication circuit 115 may perform the process on the basis of a wireless LAN represented by IEEE 802.11 or a system related to a narrowband wireless communication such as Bluetooth (registered trademark). Further, the wireless communication unit may be combined with or replaced with a wired communication unit using known wired connection.

The memory 117 is configured from an appropriate combination of a semiconductor memory such as a RAM or a ROM, a magnetic disk such as an HDD, a storage device such as a magneto-optical disk or an optical disk, a flash memory, and a removable medium. In the memory 117, the program for executing the game application according to the present embodiment, the user information, the unit game information, and the character information used in the execution of the program, the image data for drawing the game space, and the like are stored. Further, in the memory 117, the state of the battery 114 transmitted from the battery control circuit 113, for example, the residual capacity of the battery 114 and the result as to whether the battery 114 is being charged are stored. These pieces of information are appropriately read upon an instruction from the processor 112. The memory 117 functions as a storage unit in the present embodiment.

The operation unit 118 includes the touch panel 118-1, the various hard keys 118-2, and the like. The operation unit 118 receives various instructions and an input from a user, and transmits a detected signal to the processor 112. Then, the signal is used in various processes regarding the game application in the present embodiment. The touch panel 118-1 is arranged to cover the display 111, and outputs, to the processor 112, information of position coordinates input (contact) by an indicator, corresponding to the image data displayed by the display 111. As a touch panel type, a known type such as a resistive film type, a capacitive coupling type, or an ultrasonic surface elastic wave type can be used. Further, as the indicator, a known indicator such as a finger or a stylus pen can be used.

3. Configuration of Server Device 200

Figure 4:
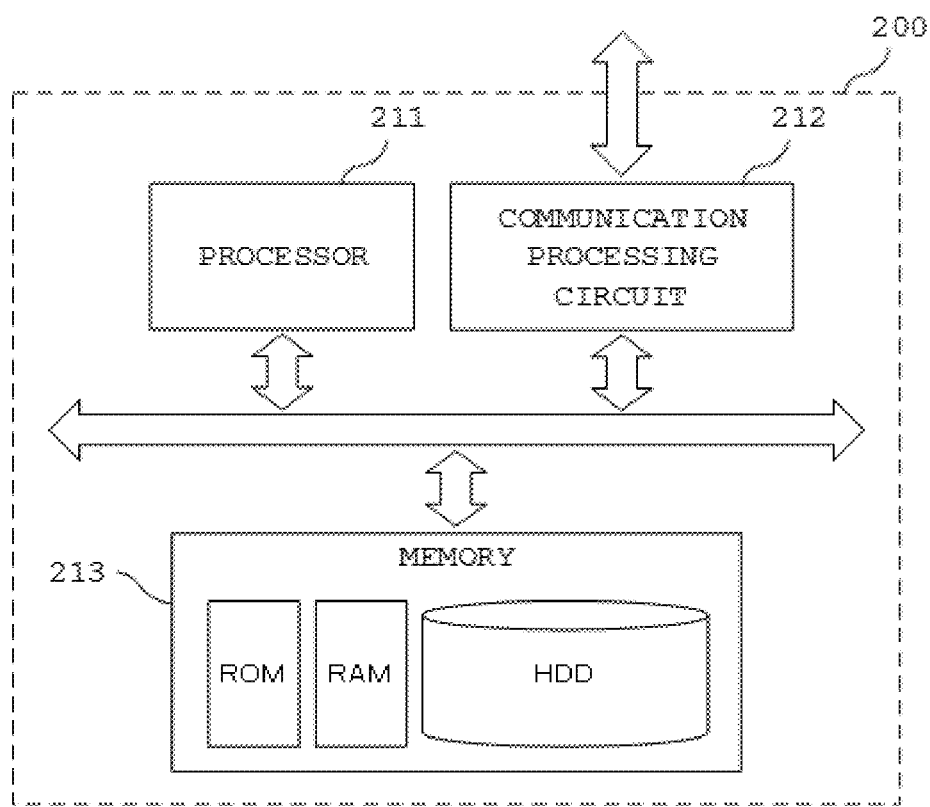
FIG. 4 is a block diagram illustrating an example of a configuration of a server device 200 according to the first embodiment of the present disclosure.

FIG. 4 is a block diagram illustrating an example of a configuration of the server device 200 according to the first embodiment of the present disclosure. Referring to FIG. 4, the server device 200 includes a processor 211, a communication processing circuit 212, and a memory 213. In the server device 200, these configuration elements are electrically connected through a control line and a data line. The server device 200 does not need to include all the configuration elements illustrated in FIG. 4, and can have a configuration in which apart of the aforementioned configuration elements is omitted, or to which another configuration element can be added. Further, FIG. 4 illustrates only the server device 200. However, the storage and the processing may be distributed in a plurality of server devices, and the server device can be configured from an appropriate combination of the plurality of server devices.

The processor 211 is configured from, as an example, a CPU (microcomputer), and controls the connected other configuration elements on the basis of various programs stored in the memory 213. To be specific, the processor 211 reads the program regarding the game application according to the present embodiment stored in the memory 213, as needed, and controls execution of the program. Further, the processor 211 controls processes of reading and updating the user information, the character information, the unit game information, and the like stored in the memory 213. Note that the processor 211 can be configured from a single processor or a combination of a plurality of processors.

The communication processing circuit 212 performs, as an example, processes of modulating and demodulating the program for execution of the game application according to the present embodiment, the user information, the character information, the unit game information, and the like, in order to transmit/receive the information, to/from the terminal devices through the network 300, or to/from another server device through the network 300. The communication processing circuit 212 is connected with an antenna, an I/O circuit, and the like, and performs communication with the terminal devices or another server device according to a predetermined communication system through the antenna and the I/O circuit.

The memory 213 is configured from an appropriate combination of a semiconductor memory such as a RAM or a ROM, a magnetic disk such as an HDD, a storage device such as a magneto-optical disk or an optical disk, a flash memory, and a removable medium. The memory 213 stores the program for the game application according to the present embodiment, a system that can execute the program, and the like. Further, the memory 213 stores the user information, the unit game information, the character information, image information, and the like use in execution of the game application.

4. Information Stored in Memory 213

FIG. 5a is a diagram illustrating an example of a user information table stored in the memory 213 according to the first embodiment. According to FIG. 5a, in the user information table, a character ID that identifies a character usable by each user in the game application, a level of each user in the game application, maximum stamina that is a current maximum value of stamina as one of parameters to be used in the game application, and remaining stamina that is a value of remaining stamina at the time of start of execution of the game application are stored in association with user IDs for identifying the users. In the present embodiment, when execution of the game application is instructed by the user, and the user ID is received from the terminal device 100, and/or according to the progress of the game application, as needed, the user information associated with the user ID is read and transmitted to the terminal device 100. The terminal device 100 that has received the information stores the information in the memory 117 of the terminal device 100 in at least a temporary manner, and appropriately reads and uses the received information according to the progress of the game application.

FIG. 5b is a diagram illustrating an example of a unit game information table stored in the memory 213 according to the first embodiment of the present disclosure. According to FIG. 5b, in the unit game information table, consumed stamina that identifies the amount of stamina consumed by selection/execution of each unit game is stored in association with a unit game ID that identifies the unit game. In the present embodiment, when an instruction of execution of the game application by the user is received from the terminal device 100, and/or according to the progress of the game application, as needed, necessary unit game information is read and transmitted to the terminal device 100. The terminal device 100 that has received the information stores the information in the memory 117 of the terminal device 100 in at least a temporary manner, and appropriately reads and uses the received information according to the process of the game application.

FIG. 5c is a diagram illustrating an example of a character information table stored in the memory 213 according to the first embodiment of the present disclosure. According to FIG. 5c, in the character information table, attack power, defense power, recovery power, a magic, a hit point, and a special ability of a character to be used in the game application are stored in association with each character ID. In the present embodiment, when execution of the game application is instructed by the user and the user ID is received from the terminal device 100, and/or according to the progress of the game application, as needed, the character information is read and transmitted to the terminal device 100. The terminal device 100 that has received the information stores the information in the memory 117 of the terminal device 100 in at least a temporary manner, and appropriately reads and uses the received information according to the progress of the game application.

Note that, although not especially illustrated, a drawing probability table by which a drawing probability parameter to be used to determine whether an enemy character is provided to (captured by) the user as a character usable by the user at a predetermined drawing probability is stored in the memory 117, in addition to the aforementioned information. This information is also transmitted to the terminal device 100, stored in the memory 117, and read and used, as needed, according to the progress of the game.

5. Control Flow of Game Application Executed in Terminal Device 100

In the present embodiment, as an example, when the user selects an icon of the game application displayed on a standby screen of the terminal device 100, the game application is started (not illustrated). After the start, the user ID is transmitted to the server device 200, and the user information, the unit game information, the character information, and the like necessary for execution of the game application are received from the server device 200. Then, the processor 112 displays a screen for prompting the user to select the unit game included in the game application according to the progress of the game.

Figure 6:
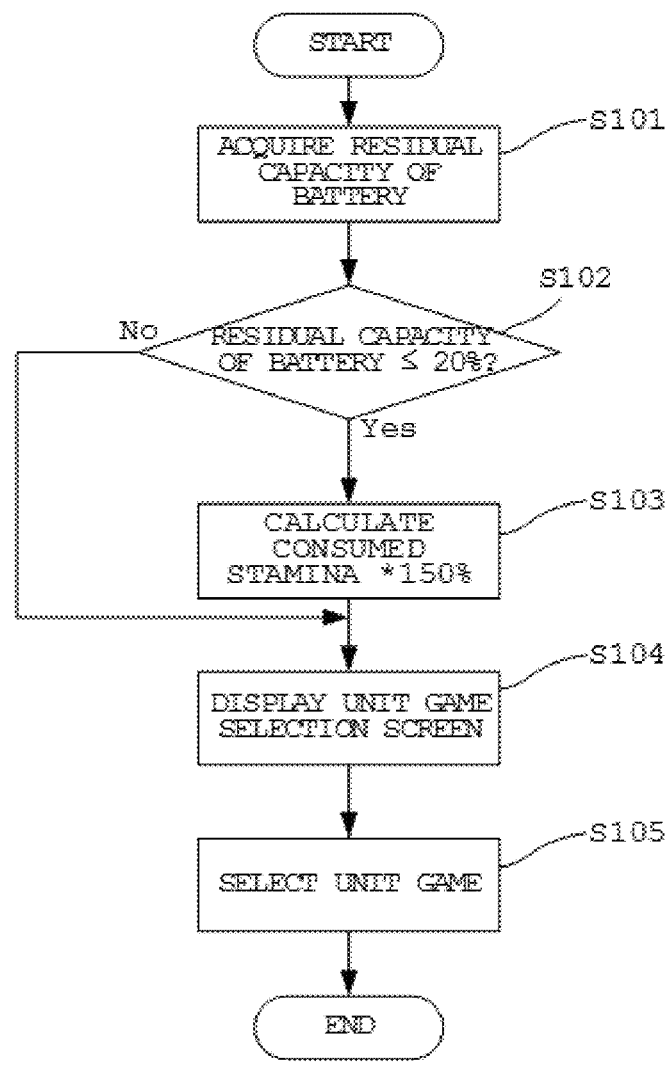
FIG. 6 is a diagram illustrating a control flow executed in the terminal device 100 according to the first embodiment of the present disclosure.

FIG. 6 is a diagram illustrating a control flow executed in the terminal device 100 according to the first embodiment of the present disclosure. To be specific, FIG. 6 illustrates a control flow according to a process of displaying the screen for prompting the user to select the unit game included in the game application. This control flow is performed as the processor 112 mainly executes the program for the game application according to the present embodiment in combination with other configuration elements.

When the control flow is started, the processor 112 acquires the residual capacity from the memory 117 as the state of the battery 114 detected in the battery control circuit 113 (S101). Next, the processor 112 determines whether the acquired residual capacity of the battery 114 falls below a predetermined residual capacity (for example, 20%) (S102). When the acquired residual capacity is determined not to fall below the predetermined residual capacity, the processor 112 reads, to the memory 117, about each unit game serving as a selection candidate, the consumed stamina stored in association with unit game without performing S103. On the other hand, when the acquired residual capacity is determined to fall below the predetermined residual capacity, the processor 112 reads, to the memory 117, about each unit game serving as a selection candidate, the consumed stamina stored in association with the unit game, and executes a varying process of multiplying the read consumed stamina by a predetermined coefficient (for example, 150%) (S103).

Next, the processor 112 executes a process of displaying a unit game selection screen on the display 111 (S104). To be specific, the processor 112 determines, about each unit game serving as a selection candidate, whether the read consumed stamina or the consumed stamina after the varying process exceeds remaining stamina stored in association with the user who executes the game application. When the consumed stamina exceeds the remaining stamina, the processor 112 displays a selection icon of the unit game as an unselectable icon. On the other hand, when the consumed stamina does not exceed the remaining stamina, the processor 112 displays the selection icon of the unit game as a selectable icon.

Figure 7A:
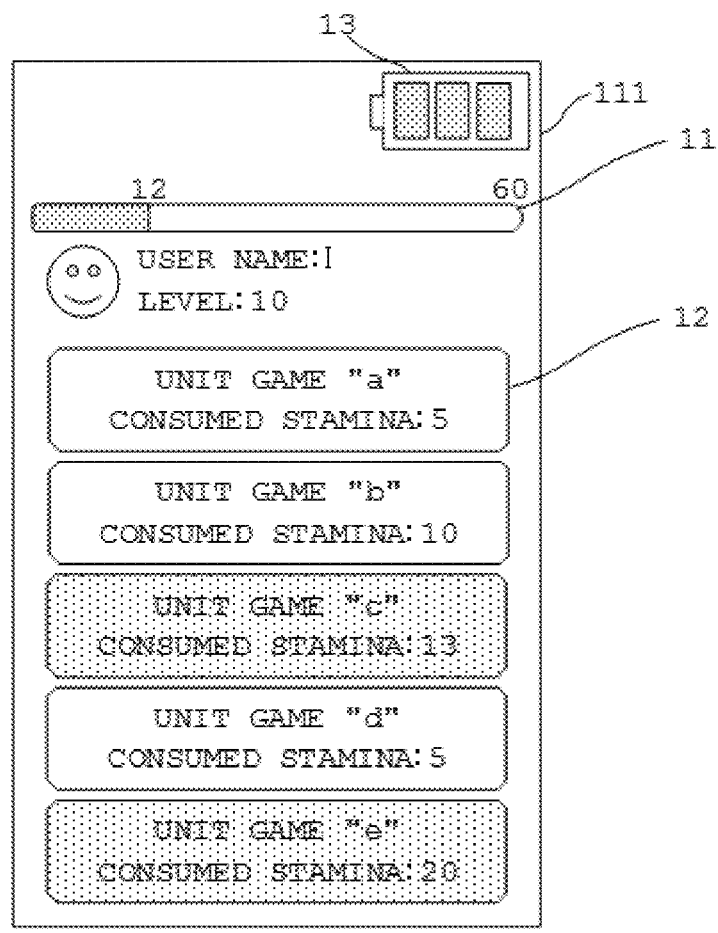
FIG. 7a is a diagram illustrating an example of a screen displayed on a display 111 of the terminal device 100 according to the first embodiment of the present disclosure.
Figure 7B:
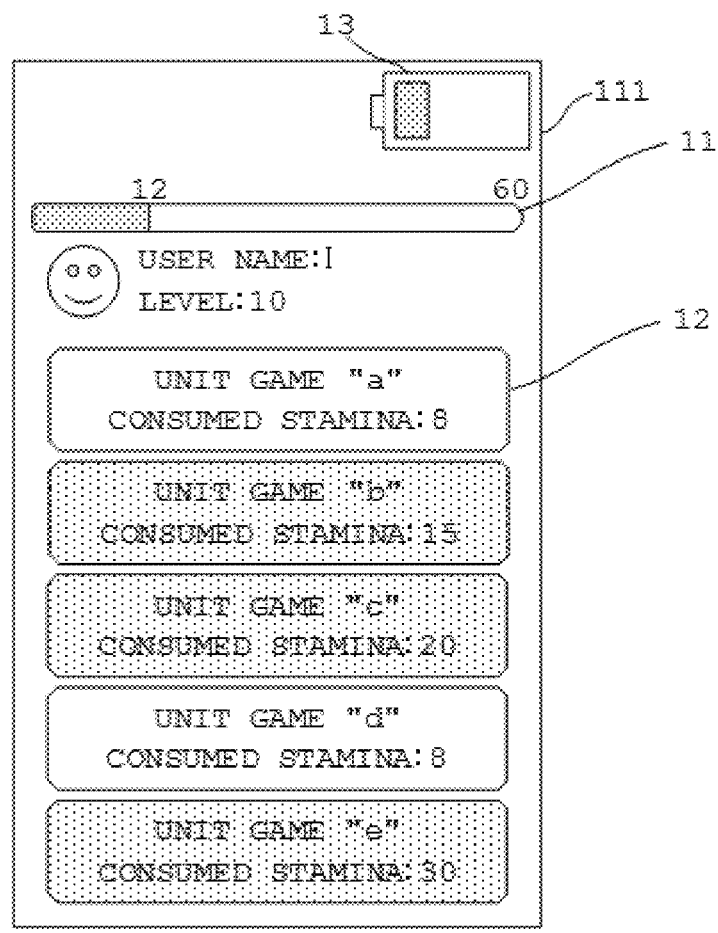
FIG. 7b is a diagram illustrating an example of the screen displayed on the display 111 of the terminal device 100 according to the first embodiment of the present disclosure.

Here, FIGS. 7a and 7b are diagrams illustrating examples of the screen displayed on the display 111 of the terminal device 100 according to the first embodiment of the present disclosure. To be specific, FIG. 7a illustrates an example of the unit game selection screen displayed in S104 when the residual capacity of the battery is determined not to fall below the predetermined residual capacity in S102. According to FIG. 7a, a battery icon 13 that indicates the current residual capacity of the battery is displayed on the display 111. Further, the user information of the user who executes the game application is read, the maximum stamina and the remaining stamina are displayed on a stamina bar 11, in addition to the user ID (user name) and a level. Further, selection icons 12 are displayed for the respective unit games serving as selection candidates. Inside the icon, the consumed stamina, which is consumed by reading the unit game information and selecting the icon, is displayed. At this time, since the residual capacity of the battery 114 has been determined not to fall below the predetermined residual capacity in S102, the value of the consumed stamina stored in the unit game information table is displayed as it is. Further, only the selection icons 12 corresponding to unit games "c" and "e" having the consumed stamina exceeding the current remaining stamina are displayed in gray that indicates the unselectable icons. On the other hand, as for the selection icons 12 corresponding to other unit games having the consumed stamina falling below the current remaining stamina, normal display that indicates the selectable icons are made (S105).

FIG. 7b illustrates an example of the unit game selection screen displayed in S104 when the residual capacity of the battery is determined to fall below the predetermined residual capacity in S102. According to FIG. 7b, the battery icon 13 displayed on the display 111 displays that the residual capacity falls below the predetermined residual capacity. Further, since the residual capacity of the battery 114 has been determined to fall below the predetermined residual capacity in S102, the varying process of multiplying the consumed stamina read from the unit game information table by the predetermined coefficient has been performed in S103. Therefore, on the selection icons 12, the consumed stamina (rounded off) after the varying process is displayed. Further, the selection icons 12 corresponding to unit games "b", "c", and "e" having the consumed stamina after the varying process, which exceeds the current remaining stamina, are displayed in gray that indicates the unselectable icons. On the other hand, as for the selection icons 12 corresponding to the unit games having the consumed stamina after the calculation process, which falls below the current remaining stamina, normal display that indicates the selectable icons is made.

Next, referring back to FIG. 6, when the processor 112 determines that a selection operation to the selection icon corresponding to the desired unit game has been detected on the unit game selection screen exemplarily illustrated in FIG. 7a or 7b, the processor 112 moves to a process of executing the selected unit game, and terminates the control flow.

Note that, in the above example, the selectable unit game is varied by varying the consumed stamina, in displaying the selectable unit game in S104 of FIG. 6. However, a condition of selection of the unit game is set in advance, and the selectable unit game can be varied according to whether the condition is satisfied, in addition to or in place of the above example.

Figure 7C:
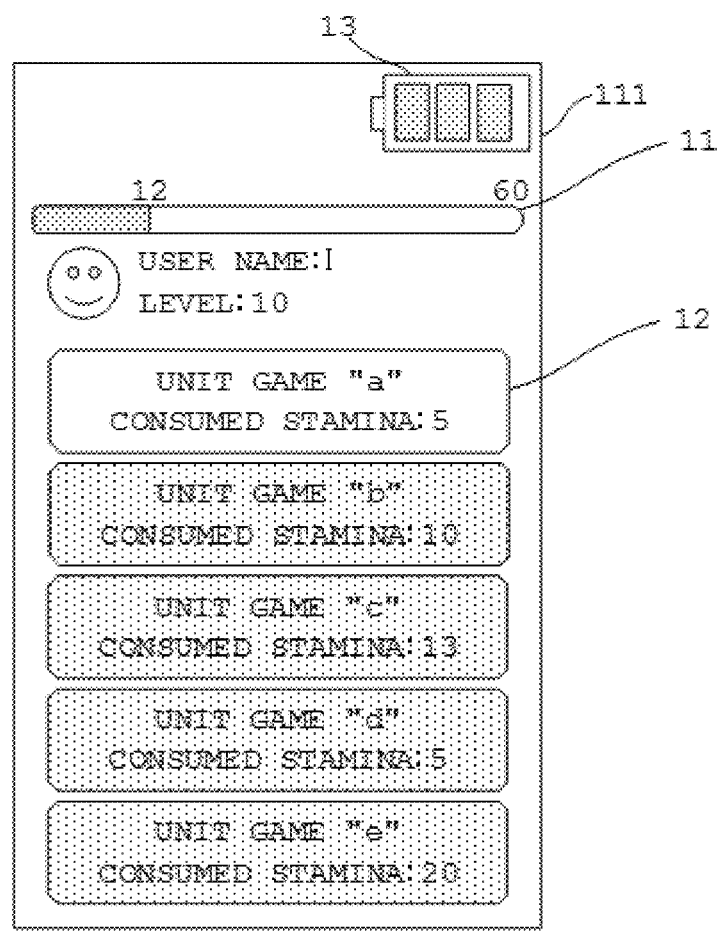
FIG. 7c is a diagram illustrating an example of the screen displayed on the display 111 of the terminal device 100 according to the first embodiment of the present disclosure.
Figure 7D:
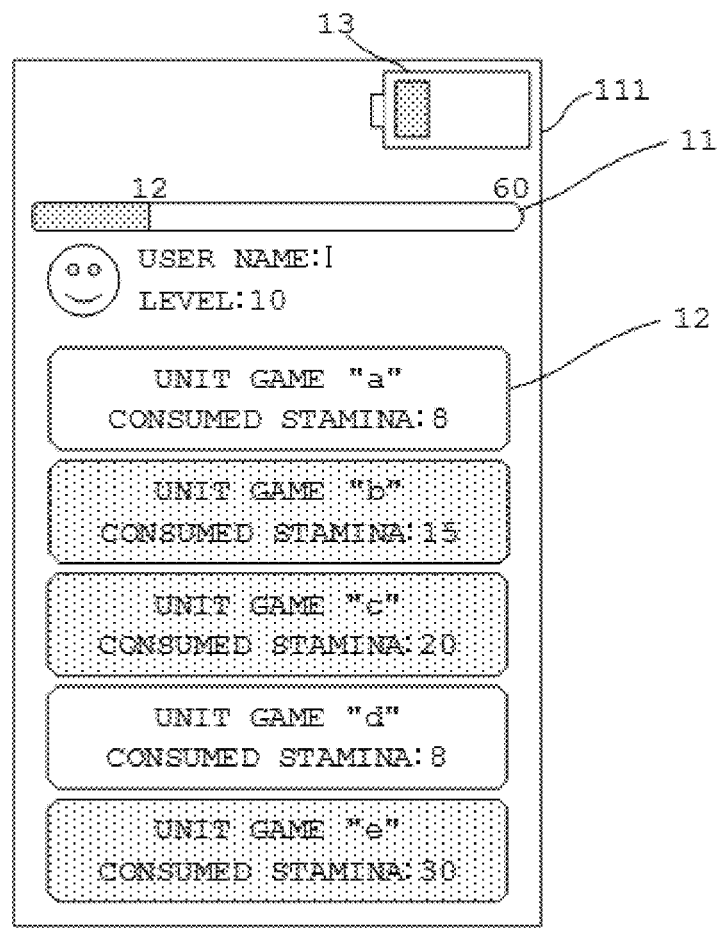
FIG. 7d is a diagram illustrating an example of the screen displayed on the display 111 of the terminal device 100 according to the first embodiment of the present disclosure.

To be specific, a "selection condition of the unit game" is newly stored in the unit game information table of FIG. 5b in association with each unit game ID. For example, a condition of "always selectable" is stored with the unit game ID "a", and a condition of "selectable only when the residual capacity of the battery is 20% or less" is stored with the unit game IDs "b" to "e". Then, in the control flow of FIG. 6, whether the residual capacity of the battery is 20% or less is determined in S102. When the residual capacity of the battery is not 20% or less, only the selection icon 12 corresponding to the unit game "a" is normally displayed that indicates the selectable icon, as exemplarily illustrated in FIG. 7c. On the other hand, when the residual capacity of the battery is determined to be 20% or less, the selection icon corresponding to "d" is displayed as the selectable icon in addition to the unit game "a", as exemplarily illustrated in FIG. 7d. Note that, in the example of FIG. 7d, the "consumed stamina" is considered in addition to the "selection condition of the unit game". Therefore, if only the "selection condition of the unit game" is taken into account, the selection icons corresponding to the unit games "c" and "e" are supposed to be displayed as the selectable icons. However, the selection icons corresponding to the unit games "c" and "e" do not have sufficient stamina, and thus are still displayed in gray that indicates the unselectable icons. Note that, in FIGS. 7c and 7d, whether becoming selectable because the residual capacity of the battery becomes the predetermined capacity or less is displayed in gray and not in gray. However, the selection icon 12 of the unit game "d" is not displayed when the residual capacity of the battery is larger than the predetermined capacity, and the selection icon 12 corresponding to the unit game "d" may be displayed as the selectable icon when the residual capacity becomes the predetermined capacity or less.

Figure 8:
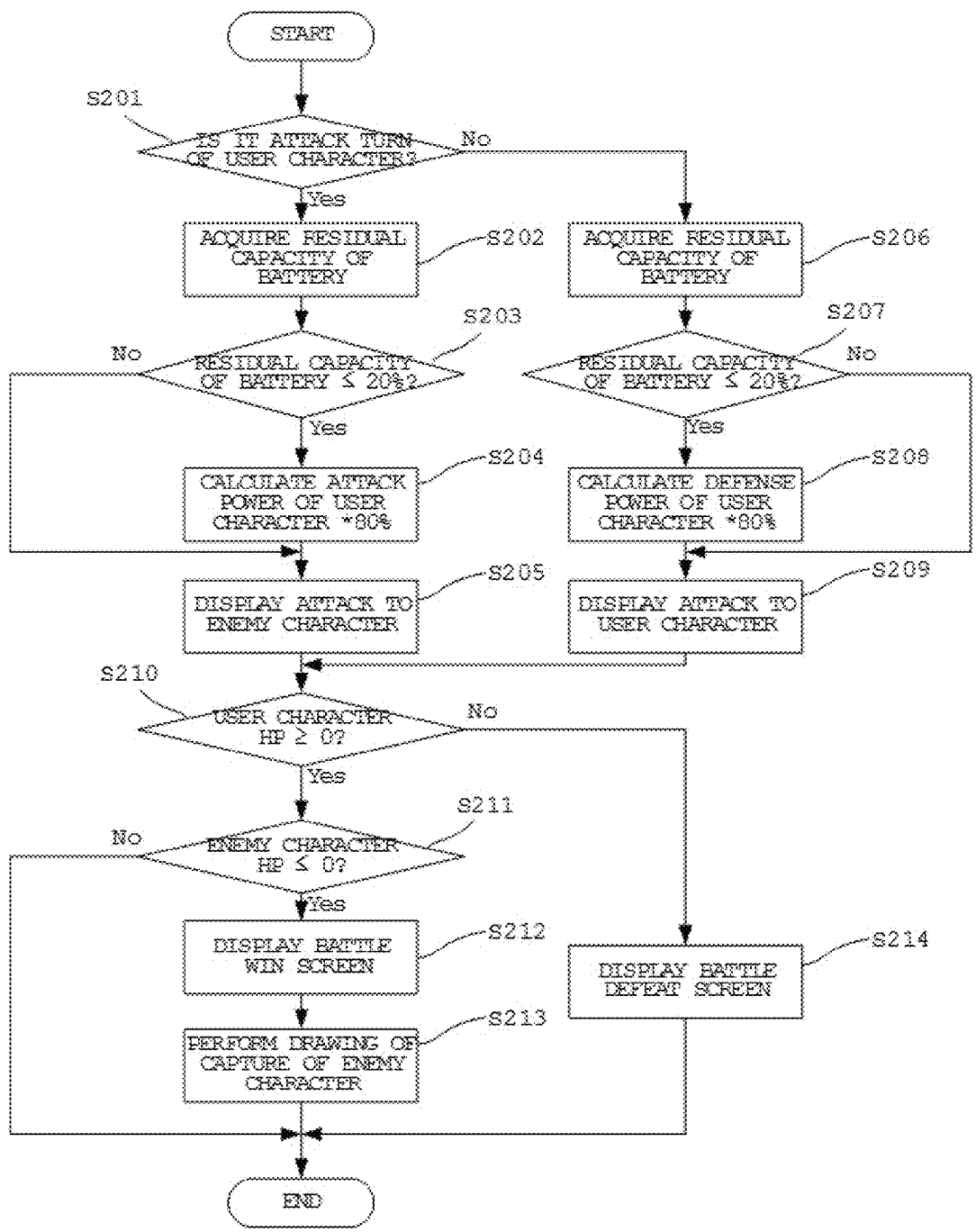
FIG. 8 is a diagram illustrating a control flow executed in the terminal device 100 according to the first embodiment of the present disclosure.

FIG. 8 is a diagram illustrating a control flow executed in the terminal device 100 according to the first embodiment of the present disclosure. To be specific, FIG. 8 illustrates a control flow according to a process of executing the selected unit game by execution of the control flow of FIG. 6. This control flow is performed as the processor 112 mainly executes the program for the game application according to the present embodiment in combination with other configuration elements.

When the control flow is started, the processor 112 determines whether it is an attack turn of the user character operable by the user himself/herself (S201). As a result of the determination, when it is the attack turn of the user character, the processor 112 acquires the residual capacity of the battery 114 detected in the battery control circuit 113 from the memory 117 (S202). Next, the processor 112 determines whether the acquire residual capacity of the battery 114 falls below the predetermined residual capacity (for example, 20%) (S203). When the residual capacity of the battery 114 is determined not to fall below the predetermined residual capacity, the processor 112 executes a process of displaying an attack scene in which the user character damages the enemy character with the attack power stored in association with the user character without performing S204 (S205), and executes a process of subtracting a hit point by the given damage from the hit point of the enemy character. On the other hand, when the residual capacity of the battery 114 is determined to fall below the predetermined residual capacity, the processor 112 executes the varying process of multiplying the attack power stored in association with the user character by a predetermined coefficient (for example, 80%) (S204). Then, the processor 112 executes the process of displaying an attack scene in which the user character damages the enemy character with the attack power after the varying process (S205), and executes the process of subtracting a hit point by the given damage from the hit point of the enemy character.

Figure 9A:
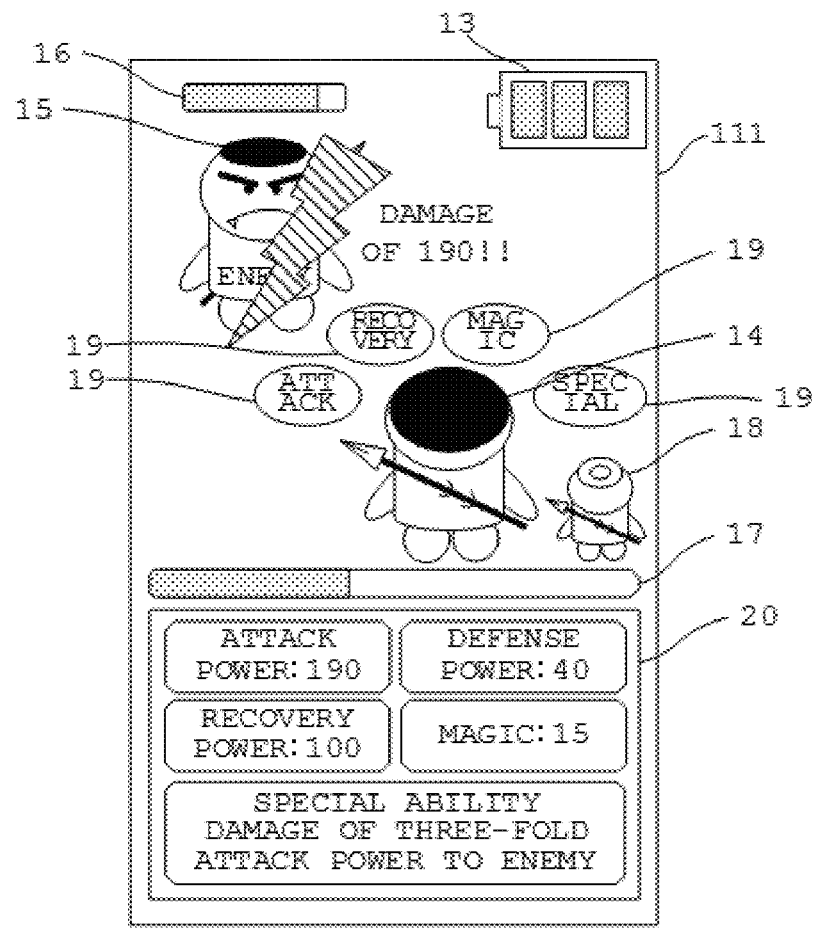
FIG. 9a is a diagram illustrating an example of the screen displayed on the display 111 of the terminal device 100 according to the first embodiment of the present disclosure.
Figure 9B:
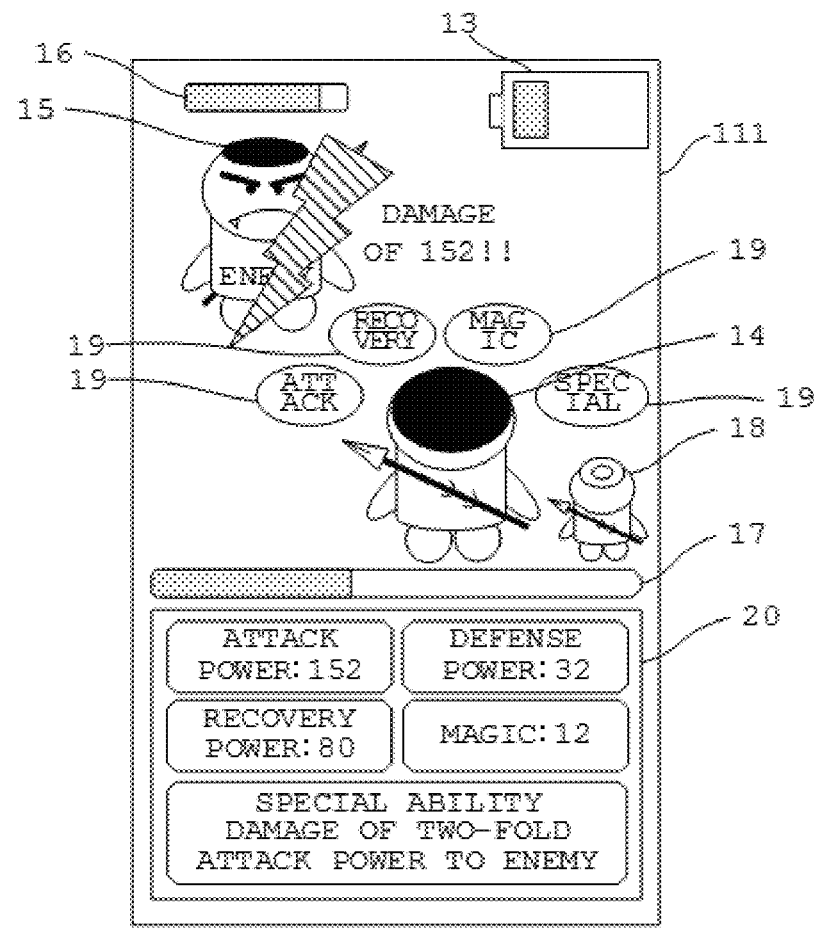
FIG. 9b is a diagram illustrating an example of the screen displayed on the display 111 of the terminal device 100 according to the first embodiment of the present disclosure.

Here, FIGS. 9a and 9b are diagrams illustrating examples of the screen displayed on the display 111 of the terminal device 100 according to the first embodiment of the present disclosure. To be specific, FIG. 9a illustrates an example of the attack scene displayed in step S205, when the residual capacity of the battery is determined not to fall below the predetermined residual capacity in S203. According to FIG. 9a, the battery icon 13 that indicates the current residual capacity of the battery is displayed on the display 111. Further, a help character 18 that assists the battle by the user character 14 is displayed in addition to a user character 14 and an enemy character 15. Further, a hit point bar 17 that indicates the current hit point of the user character 14 is displayed around the user character 14, and a hit point bar 16 that indicates the current hit point of the enemy character 15 is displayed around the enemy character 15, respectively. Further, in the unit game, command icons 19 (an attack icon, a recovery icon, a magic icon, and a special ability icon) that indicate inputtable commands by the user at the time of the attack turn of the user character are displayed.

Then, the example of FIG. 9a illustrates the attack scene of when the residual capacity of the battery has been determined not to fall below the predetermined residual capacity, and thus the parameters associated with the user character are displayed as they are in a parameter display area 20 that indicates parameter values held by the user character (FIG. 9a displays an example of a character with an character ID "A"). Further, when the user selects the attack icon to input an attack command, display of damaging the enemy character with the attack power ("190" in the case of the character ID "A") associated with the user character is made.

FIG. 9b illustrates an example of the attack scene displayed in S205 when the residual capacity of the battery is determined to fall below the predetermined residual capacity in S203. According to FIG. 9b, display indicating that the residual capacity falls below the predetermined residual capacity is made on the battery icon 13 displayed on the display 111. Further, the residual capacity of the battery 114 has been determined to fall below the predetermined residual capacity in S203, and thus the varying process of multiplying the attack power stored in association with the user character by a predetermined coefficient is performed in S204. Therefore, in the parameter display area 20, parameter values after the varying process is performed for the parameters associated with the user character are displayed (FIG. 9b displays an example of the character with the character ID "A"). Further, when the user selects the attack icon to input the attack command, display of damaging the enemy character with the attack power ("152" in the example of the character ID "A") after the varying process is made.

Note that, in the present embodiment, as the damage given to the character, a value obtained by subtracting the defense power held by the character to be attacked from the attack power held by the character to attack is used. In the examples of FIGS. 9a and 9b, the process is performed where the defense power of the enemy character is zero, for convenience of description. The calculation of the damage is not limited to the above example, and a known calculation method can be appropriately used.

Referring back to FIG. 8, when it is determined not to be the attack turn of the user character in S201, the processor 112 acquires the residual capacity of the battery 114 detected in the battery control circuit 113 from the memory 117 (S206). Next, the processor 112 determines whether the acquired residual capacity of the battery 114 falls below the predetermined residual capacity (for example, 20%) (S207). When the residual capacity of the battery 114 is determined not to fall below the predetermined residual capacity, the processor 112 executes a process of displaying an attack scene in which the user character is attacked by the enemy character with the defense power stored in association with the user character without performing S208 (S209), and executes the process of subtracting a hit point by the given damage from the hit point of the user character. On the other hand, when the residual capacity of the battery 114 is determined to fall below the predetermined residual capacity, the processor 112 executes the varying process of multiplying the defense power stored in association with the user character by a predetermined coefficient (for example, 80%) (S208). Then, the processor 112 performs the process of displaying an attack scene in which the user character is attacked by the enemy character with the defense power after the varying process (S209), and executes the process of subtracting a hit point by the given damage from the hit point of the enemy character.

Next, the processor 112 determines whether the current hit point of the user character exceeds zero (S210). As a result, when the current hit point of the user character exceeds zero, the processor 112 determines whether the current hit point of the enemy character falls below zero (S211). As a result, when the current hit point of the enemy character falls below zero, the processor 112 considers that the user character wins against the enemy character in the battle in the executed unit game, and displays a battle win screen (S212). Further, in S210, when the hit point of the user character falls below zero, the processor 112 considers that the user character is defeated by the enemy character, and displays a battle defeat screen (S214). Further, in S210 and S211, when both the hit point of the user character and the hit point of the enemy character exceed zero, the processor 112 terminates the control flow without performing display of S212 and S214. Note that, in this case, the control flow of FIG. 8 is repeated with a predetermined period.

As a result of the execution of the unit game, when the user character wins against the enemy character (that is, "Yes" in both S210 and S211), the processor 112 performs drawing using a pseudorandom number, and executes a process of providing the battled enemy character as a user character operable by the user himself/herself according to a result of the drawing (S213). The drawing is executed by reading the drawing probability table in which the drawing probability is stored in advance. At this time, as an example, two drawing probability tables including a first drawing probability table in which the drawing probability (the probability to be provided to the character) is normal, and a second drawing probability table in which the drawing probability falls below the normal probability are stored in the memory 213, and the drawing probability table to be used is varied according to the residual capacity of the battery 114. To be specific, the processor 112 performs the drawing using the first drawing probability table when the residual capacity of the battery 114 exceeds the predetermined residual capacity, and performs the drawing using the second drawing probability table when the residual capacity of the battery 114 falls below the predetermined residual capacity. The processor 112 provides the enemy character as the user character operable by the user himself/herself when a winning number stored in the used drawing probability table and the pseudorandom number are matched. Accordingly, the processor 112 terminates the control flow according to the execution of the unit game.

As described above, in the first embodiment, the terminal device capable of executing a game application having higher enjoyment can be provided by varying the content of the game performed by execution of the game application according to the present embodiment according to the state of the terminal device 100, to be specific, the residual capacity of the battery 114. Especially, in a case where the parameter to be used in the execution of the game application is varied, the parameter is varied by a cause is irrelevant to a skill of the user or an ability of the user character, such as the residual capacity of the battery 114. Therefore, new enjoyment can be provided to the user. Further, a predetermined unit game is made selectable only within a limited time (for example, a time when only 20% of the residual capacity of the battery 114 remains, for example), and thus the user tackles the game under pressure to beat the game within a very limited time although the user wants to deal with the game while taking time to consider measures against the unit game, which provide new enjoyment to the user.

Further, in a case where the residual capacity of the battery 114 is decreased, prompting the user to advance the game application as early as possible to help the user can be considered. However, in the present embodiment, the content of the game is varied to go against the user who inputs the instruction to the game application. Therefore, the unprecedented new and high enjoyment that "the residual capacity of the battery 114 is decreased and the game is forcibly terminated, and thus the user needs to beat the game as early as possible" can be provided to the user, in addition to enjoyment of the content of the game application itself.

Second Embodiment

A system according to a second embodiment is configured from a terminal device 100, a server device 200, and a network 300, similarly to the system 1 according to the first embodiment. Hereinafter, a specific configuration and process of the system according to the present embodiment will be described. Detailed description of points similar to the configuration, process, and procedure in the first embodiment is omitted.

In the present embodiment, a game application is executed as so-called a web application, in which a control flow executed by a processor 112 and the like is mainly executed in a processor 211 of the server device 200, and a result of the execution is transmitted to the terminal device 100 and displayed on a display 111, as needed, in FIGS. 6 and 8. To be specific, although the control flow is not especially illustrated, the server device 200 receives a residual capacity of a battery 114 detected in a battery control circuit 113 of the terminal device 100 through the network 300, in S101 of FIG. 6, and S202 and S206 of FIG. 8, and the processor 211 of the server device 200 executes the subsequent processes on the basis of the received residual capacity of the battery 114. Further, the server device 200 transmits a result of the process to the terminal device 100 through the network 300, as needed. The received result of the process is displayed on the display 111 of the terminal device 100.

As described above, in the second embodiment, the terminal device capable of executing a game application having higher enjoyment can be provided by varying the content of the game performed by execution of the game application according to the present embodiment according to the state of the terminal device 100, to be specific, the residual capacity of the battery 114, similarly to the first embodiment. Further, the content of the game is varied to go against the user who inputs the instruction to the game application. Therefore, the unprecedented new and high enjoyment that "the residual capacity of the battery 114 is decreased and the game is forcibly terminated, and thus the user needs to beat the game as early as possible" can be provided to the user, in addition to enjoyment of the content of the game application itself.

Third Embodiment

A system according to a third embodiment is configured from only a terminal device 100, unlike the first and second embodiments. Hereinafter, a specific configuration and process of the system according to the present embodiment will be described. Detailed description of points similar to the configuration, process, and procedure in the first embodiment is omitted.

In the present embodiment, the terminal device 100 downloads a program regarding a game application from a server device 200 or the like through a network in advance, or is connected with a recording medium on which the program is recorded through an I/O circuit (not illustrated). Further, the terminal device 100 stores user information, unit game information, and character information to be used for execution of the game application to an own memory 117 or on the recording medium. Then, the terminal device 100 executes control flows of FIGS. 6 and 8 on the basis of the information without performing communication with the server device 200, as needed.

As described above, in the third embodiment, the terminal device capable of executing a game application having higher enjoyment can be provided by varying the content of the game performed by execution of the game application according to the present embodiment according to the state of the terminal device 100, to be specific, the residual capacity of the battery 114, similarly to the first and second embodiments. Further, the content of the game is varied to go against the user who inputs the instruction to the game application. Therefore, the unprecedented new and high enjoyment that "the residual capacity of the battery 114 is decreased and the game is forcibly terminated, and thus the user needs to beat the game as early as possible" can be provided to the user, in addition to enjoyment of the content of the game application itself.

Modification

The first to third embodiments have been described. However, modifications exemplarily described below can also be appropriately applied.

For example, in the first to third embodiments, the parameter to be used in the game application is varied on the basis of the residual capacity of the battery 114. However, a parameter can be varied on the basis of whether a battery 114 is being charged as a state of a game, that is, a charged state of the battery 114, or both a residual capacity of the battery 114 and the charged state of the battery 114.

Figure 10:
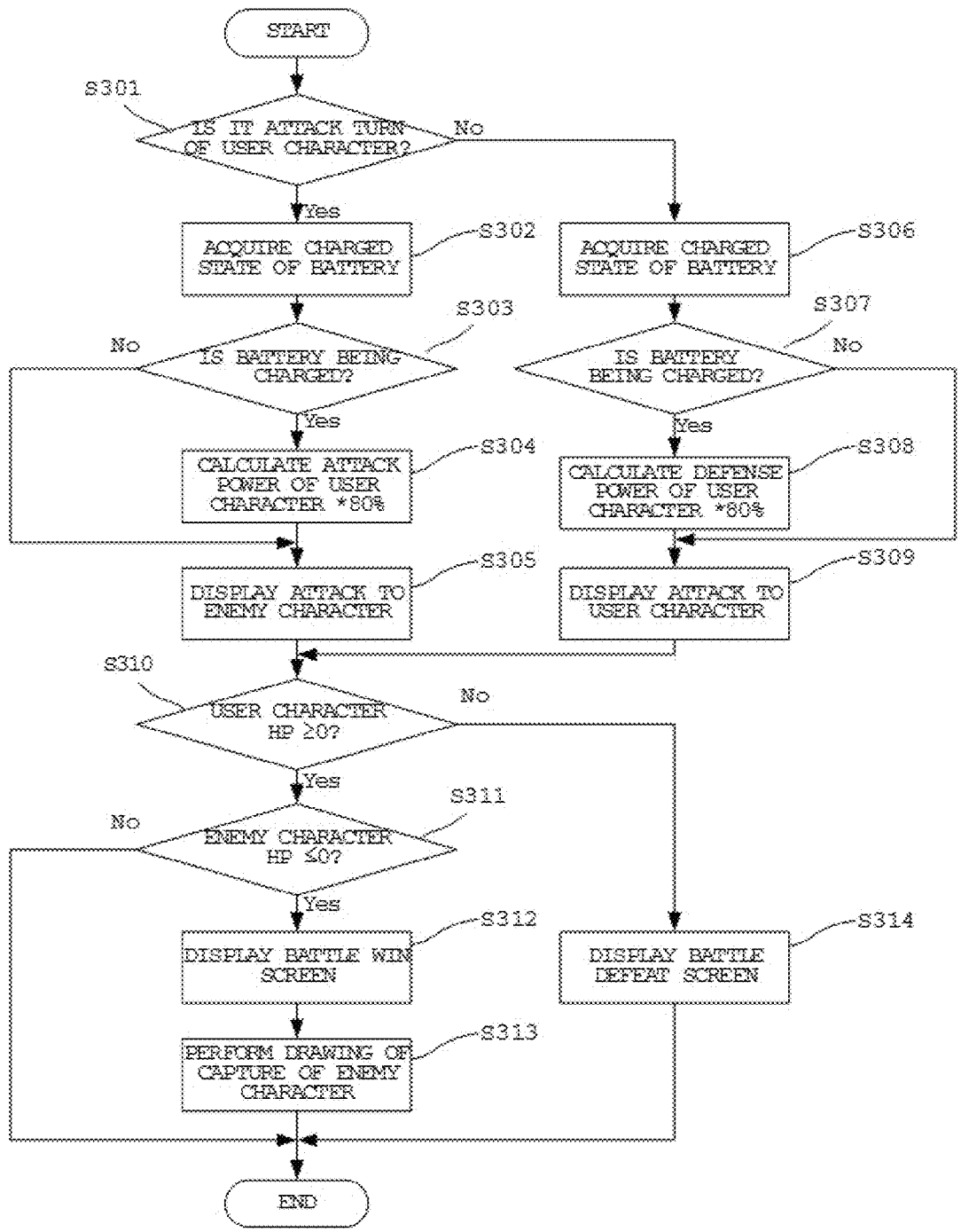
FIG. 10 is a diagram illustrating a modification of the control flow executed in the terminal device 100 according to the first to third embodiments of the present disclosure.

FIG. 10 is a diagram illustrating a modification of the control flow executed in the terminal device 100 according to the first to third embodiments of the present disclosure. To be specific, a control flow executed by a processor 211 when a parameter is varied on the basis of the charged state of the battery 114, of the above modification, will be described.

To be specific, in FIG. 10, the processor 112 acquires, from a memory 117, a state as to whether the battery 114 is being charged detected in a battery control circuit 113, in place of the processor 112 acquiring the residual capacity of the battery from the memory 117 in S202 and S206 of FIG. 8. Then, the processor 112 determines whether the battery 114 is being charged in S303 and S307 of FIG. 10, in place of the processor 112 determining whether the residual capacity of the battery exceeds the predetermined residual capacity in S203 and S207 of FIG. 8. When the battery 114 is being charged, the processor 112 proceeds to S304 or S308, and executes a predetermined process for parameters of attack power or defense power of a user character.

Further, the processor 112 changes a drawing probability table to be used on the basis of whether the battery 114 is being charged in S313 of FIG. 10, in place of the processor 112 varying the drawing probability according to the residual capacity of the battery 114 in S213 of FIG. 8.

Other processes are similar to those of FIG. 8. Note that, in this modification, an example in which the residual capacity of the battery 114 of FIG. 8 is changed to the charged state of the battery 114 has been described. In the control regarding the consumed stamina illustrated in FIG. 6, the residual capacity of the battery 114 can be also changed to the charged state of the battery 114. Further, an example in which the residual capacity of the battery 114 is changed to the charged state of the battery 114 has been described. However, it is also possible to perform control on the basis of both the residual capacity and the charged state of the battery 114, by adding a step of acquiring the charged state of the battery 114 and performing determination on the basis of the acquired charged state, before or after the step of acquiring the residual capacity of the battery 114 and performing determination on the basis of the acquired residual capacity.

In the example of FIG. 6, when the residual capacity of the battery 114 falls below the predetermined residual capacity, the processor 112 executes the varying process of multiplying the consumed stamina associated with the unit game ID by a predetermined coefficient. However, an example is not limited thereto, and maximum stamina or remaining stamina associated with the user may be varied.

Further, in the example of FIG. 8, when the residual capacity of the battery 114 falls below the predetermined residual capacity, the processor 112 executes the varying process of multiplying the attack power or the defense power associated with the user character by a predetermined coefficient. However, an example is not limited thereto, and another parameter (for example, recovery power, a magic, a hit point, or a special ability) associated with the user character may be varied. To be specific, as described in FIG. 9b, when a recovery command is selected in attack turn by the user character in a case where the varying process of multiplying the recovery power by a predetermined coefficient is performed, a recovery process of the hit point is performed with the recovery power after the varying process. Further, when a special ability command is selected in attack turn by the user character in a case where the varying process of multiplying the special ability by a predetermined coefficient, the special ability is invoked with an ability value after the varying process. Further, in a case of the varying process of multiplying the hit point by a predetermined coefficient, a remaining hit point, a maximum value of the hit point, or both the remaining hit point and the maximum value of the hit point may be varied.

The varying process of the content (the parameters and selectable unit games) of the game may be executed for all the stamina, the ability parameter, the drawing probability, and the selectable unit games. However, the varying process may be executed for some of the content. Further, content other than the above content may be varied. Examples of the content other than the above content include varying a probability parameter of a critical hit that temporarily increases damage to an opponent than usual at the time of an attack of the user character or the enemy character, and varying a parameter of an appearance frequency of the enemy character.

The exemplified coefficients multiplied in the varying process of the parameter are examples, and other coefficients can be used. To be specific, a coefficient not going against the user, that is, a coefficient in favor of the user may be used. Further, as for the selection of the unit game, the unit game may be made unselectable when the residual capacity falls below the predetermined residual capacity. Further, in the determination as to whether performing the varying process, whether the residual capacity of the battery 114 falls below the predetermined residual capacity (for example, 20%) has been used as a determination criteria. However, determination may be made in a stepwise manner such as 60%, 40%, and 20%.

In the first to third embodiments, an example in which the user character battles against the enemy character in the unit game has been described. However, an example to which the present invention is applicable is not limited thereto. As an example, in a block collapsing game, varying a length of a paddle or a speed of a ball for collapsing the blocks according to the residual capacity of the battery can be considered. In a game that has a time limit to finish the game, such as a puzzle game, varying the time limit or a probability parameter of drawing in the game according to the residual capacity of the battery can be considered. Further, in a game in which characters move on a virtual map or a map of the actual world, varying encounter frequencies with an enemy character, another user character, and an item, an acquisition probability of a new map, a moving speed of the user character, or the like according to the residual capacity of the battery can be considered. Further, in a case of performing drawing of various virtual items and characters, using in-game currency in the game application, varying drawing probability parameters to get the items and characters, and a condition of when the drawing is performed can be considered.

The system according to the present disclosure has been described in the first to third embodiments. However, the system can be configured in appropriate combination of the elements described in the first to third embodiments.

The processes and procedures described in the present specification can also be realized by software, hardware, or any combination thereof other than those explicitly stated in the embodiments. More specifically, the processes and procedures described in the present specification is realized by installation of the logic corresponding to the processes into a medium such as an integrated circuit, a volatile memory, a non-volatile memory, a magnetic disk, or an optical storage. The processes and procedures described in the present specification can also be mounted in the form of a computer program, and executed by various computers including terminal device or server device.

Even if the processes and the procedures described in the present specification are executed by a single apparatus, software piece, component, or module, such processes and procedures can also be executed by a plurality of apparatuses, software pieces, components, and/or modules. Even if the various pieces of information described in the present specification are stored in a single memory unit or storage unit, such information can also be distributed and stored in a plurality of memory units included in a single apparatus or in a plurality of memory units distributed and arranged in a plurality of apparatuses. The elements of the software and the hardware described in the present specification can be realized by being integrated into fewer configuration elements or being decomposed into more configuration elements.

What is claimed is:

1. A terminal device comprising:
   a battery that stores power, the terminal device being operated by the power stored in the battery;
   a battery control circuit that detects a state of the battery, the state including first and second battery states;
   a memory that stores non-transitory computer-readable instructions and the state of the battery; and
   a processor that executes the non-transitory computer-readable instructions so as to:
      execute a predetermined game application having a parameter on the terminal device according to an instruction of a user, the parameter including first and second game parameters;
      set the parameter to the first game parameter when the state of the battery is the first battery state; and
      set the parameter to the second game parameter when the state of the battery is the second battery state,
   wherein the first game parameter is beneficial to the user than the second game parameter when the processor executes the predetermined game application, and
   wherein the parameter is one of an ability parameter, a stamina parameter, or a drawing probability parameter,
   when the parameter is the ability parameter, the ability parameter relating to a user character of the user, and the first game parameter makes the user character stronger than the second game parameter,
   when the parameter is the stamina parameter, the predetermined game application is configured with a plurality of unit games, the stamina parameter is consumed when the processor executes one of the plurality of unit games, the stamina parameter is recovered as an execution time of the plurality of unit games proceeds, and the processor prevents the plurality of unit games from executing when the stamina parameter is entirely consumed, and
   when the parameter is the drawing probability parameter, the drawing probability parameter corresponds to a drawing probability in providing the user with an enemy character battled with the user character of the user in the predetermined game application when the user character wins against the enemy character.

2. The terminal device according to claim 1,
   wherein the ability parameter is one of attack power, defense power, recovery power, a special ability, and a hit point relating to the user character.

3. The terminal device according to claim 1,
   wherein the processor changes the first game parameter to the second game parameter as an execution time of the predetermined game application proceeds.

4. The terminal device according to claim 1,
   wherein the state of the battery is either a residual capacity of the battery or a charging/non-charging state of the battery.

5. A computer program product embodying non-transitory computer-readable instructions stored on a non-transitory computer-readable medium for causing a computer to execute a process by a processor, the computer including:

a battery that stores power, the computer being operated by the power stored in the battery; and a battery control circuit that detects a state of the battery, the state including first and second battery states, the computer performs the steps of:

executing a predetermined game application having a parameter on the computer according to an instruction of a user, the parameter including first and second game parameters;

setting the parameter to the first game parameter when the state of the battery is the first battery state; and setting the parameter to the second game parameter when the state of the battery is the second battery state, wherein the first game parameter is beneficial to the user than the second game parameter when the processor executes the predetermined game application, and wherein the parameter is one of an ability parameter, a stamina parameter, or a drawing probability parameter, when the parameter is the ability parameter, the ability parameter relating to a user character of the user, and the first game parameter makes the user character stronger than the second game parameter, when the parameter is the stamina parameter, the predetermined game application is configured with a plurality of unit games, the stamina parameter is consumed when the processor executes one of the plurality of unit games, the stamina parameter is recovered as an execution time of the plurality of unit games proceeds, and the processor prevents the plurality of unit games from executing when the stamina parameter is entirely consumed, and when the parameter is the drawing probability parameter, the drawing probability parameter corresponds to a drawing probability in providing the user with an enemy character battled with the user character of the user in the predetermined game application when the user character wins against the enemy character.

6. The computer program product according to claim 5, wherein the ability parameter is one of attack power, defense power, recovery power, a special ability, and a hit point relating to the user character.

7. The computer program product according to claim 5, wherein the state of the battery is either a residual capacity of the battery or a charging/non-charging state of the battery.

8. A method for causing a processor in a terminal device to execute a process, the terminal device including:

a battery that stores power, the terminal device being operated by the power stored in the battery; and a battery control circuit that detects a state of the battery, the state including first and second battery states, the method comprising executing on the processor the steps of:

executing a predetermined game application having a parameter on the terminal device according to an instruction of a user, the parameter including first and second game parameters;

setting the parameter to the first game parameter when the state of the battery is the first battery state; and setting the parameter to the second game parameter when the state of the battery is the second battery state, wherein the first game parameter is beneficial to the user than the second game parameter when the processor executes the predetermined game application, and wherein the parameter is one of an ability parameter, a stamina parameter, or a drawing probability parameter, when the parameter is the ability parameter, the ability parameter relating to a user character of the user, and the first game parameter makes the user character stronger than the second game parameter, when the parameter is the stamina parameter, the predetermined game application is configured with a plurality of unit games, the stamina parameter is consumed when the processor executes one of the plurality of unit games, the stamina parameter is recovered as an execution time of the plurality of unit games proceeds, and the processor prevents the plurality of unit games from executing when the stamina parameter is entirely consumed, and when the parameter is the drawing probability parameter, the drawing probability parameter corresponds to a drawing probability in providing the user with an enemy character battled with the user character of the user in the predetermined game application when the user character wins against the enemy character.

9. The method according to claim 8,
wherein the ability parameter is one of attack power, defense power, recovery power, a special ability, and a hit point relating to the user character.

10. The method according to claim 8,
wherein the state of the battery is either a residual capacity of the battery or a charging/non-charging state of the battery.

11. A terminal device comprising:

a battery that stores power, the terminal device being operated by the power stored in the battery;

a battery control circuit that detects a state of the battery, the state including first and second battery states;

a memory that stores non-transitory computer-readable instructions and the state of the battery; and a processor that executes the non-transitory computer-readable instructions so as to:

execute a predetermined game application having a parameter on the terminal device according to an instruction of a user, the parameter including first and second game parameters;

set the parameter to the first game parameter when the state of the battery is the first battery state; and set the parameter to the second game parameter when the state of the battery is the second battery state, wherein the first game parameter is more beneficial to the user than the second game parameter when the processor executes the predetermined game application, and wherein the processor changes the first game parameter to the second game parameter as an execution time of the predetermined game application proceeds.

12. The terminal device according to claim 11,
wherein the parameter is an ability parameter relating to a user character of the user, and the first game parameter makes the user character stronger than the second game parameter, and the ability parameter is one of attack power, defense power, recovery power, a special ability, or a hit point relating to the user character.

13. The terminal device according to claim 11,
wherein the state of the battery is either a residual capacity of the battery or a charging/non-charging state of the battery.

14. A computer program product embodying non-transitory computer-readable instructions stored on a non-transitory computer-readable medium for causing a computer to execute a process by a processor, the computer including:

a battery that stores power, the computer being operated by the power stored in the battery; and a battery control circuit that detects a state of the battery, the state including first and second battery states, the computer performing the steps of:

executing a predetermined game application having a parameter on the computer according to an instruction of a user, the parameter including first and second game parameters;

setting the parameter to the first game parameter when the state of the battery is the first battery state; and setting the parameter to the second game parameter when the state of the battery is the second battery state, wherein the first game parameter is more beneficial to the user than the second game parameter when the processor executes the predetermined game application, and wherein the processor changes the first game parameter to the second game parameter as an execution time of the predetermined game application proceeds.

15. The computer program product according to claim 14, wherein the parameter is an ability parameter relating to a user character of the user, and the first game parameter makes the user character stronger than the second game parameter, and the ability parameter is one of attack power, defense power, recovery power, a special ability, and a hit point relating to the user character.

16. The computer program product according to claim 14, wherein the state of the battery is either a residual capacity of the battery or a charging/non-charging state of the battery.

17. A method for causing a processor in a terminal device to execute a process, the terminal device including:

a battery that stores power, the terminal device being operated by the power stored in the battery; and a battery control circuit that detects a state of the battery, the state including first and second battery states, the method comprising executing on the processor the steps of:

executing a predetermined game application having a parameter on the terminal device according to an instruction of a user, the parameter including first and second game parameters;

setting the parameter to the first game parameter when the state of the battery is the first battery state; and setting the parameter to the second game parameter when the state of the battery is the second battery state, wherein the first game parameter is more beneficial to the user than the second game parameter when the processor executes the predetermined game application, and wherein the processor changes the first game parameter to the second game parameter as an execution time of the predetermined game application proceeds.

18. The method according to claim 17, wherein the parameter is an ability parameter relating to a user character of the user, and the first game parameter makes the user character stronger than the second game parameter, and the ability parameter is one of attack power, defense power, recovery power, a special ability, and a hit point relating to the user character.

19. The method according to claim 17, wherein the state of the battery is either a residual capacity of the battery or a charging/non-charging state of the battery.

* * * * *